July 7, 1925.

R. W. GOSSETT 1,544,975

WRIST PIN BEARING

Filed April 8, 1924

Inventor
Robert W Gossett
Davis & Davis
By
Attorneys

Patented July 7, 1925.

1,544,975

UNITED STATES PATENT OFFICE.

ROBERT W. GOSSETT, OF SPARTANBURG, SOUTH CAROLINA, ASSIGNOR TO MANUFACTURERS' EQUIPMENT COMPANY, OF SPARTANBURG, SOUTH CAROLINA, A CORPORATION OF SOUTH CAROLINA AND NORTH CAROLINA.

WRIST-PIN BEARING.

Application filed April 8, 1924. Serial No. 705,067.

*To all whom it may concern:*

Be it known that I, ROBERT W. GOSSETT, a citizen of the United States of America, and a resident of Spartanburg, county of Spartanburg, and State of South Carolina, have invented certain new and useful Improvements in Wrist-Pin Bearings, of which the following is a full and clear specification.

The object of this invention is to provide a simple anti-friction, self-oiling bearing for wrist-pins which will not bind and which will have a maximum wearing period, as more fully hereinafter set forth.

In the drawing—

Figure 1:
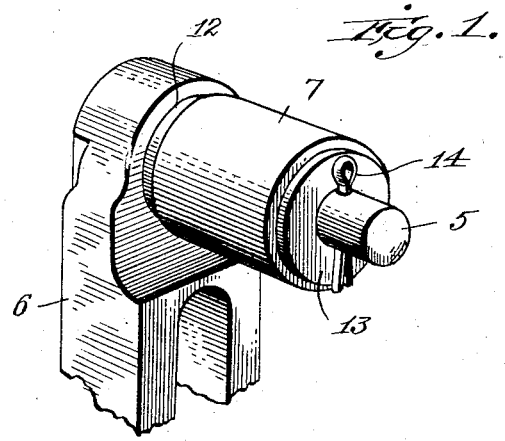
Fig. 1 is a vertical sectional view of the bearing.
Figure 2:
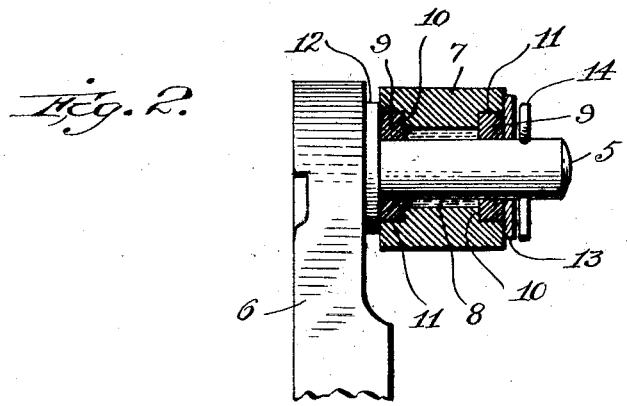
Fig. 2 is a side elevation thereof.

In the drawing annexed, 5 designates the wrist-pin which is rigidly attached to an arm or other support 6. A cylinder 7 surrounds the pin, the interior diameter of this cylinder being considerably larger than the pin in order to provide an annular grease-chamber 8. The ends of the cylinder are closed around the pin by means of a ring 9 at each side, each of these rings fitting within a rabbet formed in the end of the cylinder. Each ring abuts against an outwardly-facing shoulder 10 formed by the rabbet and its outer annular face fits against an annular inwardly-facing bearing-surface 11 formed by the rabbet within the sleeve. The rabbet is just deep enough to receive the ring 9, so that its outer face is approximately flush with the end of the cylinder. The hole in each ring fits nicely the wrist-pin. The inner ring 9 is held in place by a boss 12 on the support 6, and the outer ring 9 is held in place by a washer 13 held on the wrist-pin by means of a cotter-pin 14.

The rings 9 have free rotation on the wrist-pin and also free rotation independently of the housing cylinder 7, so that binding of the cylinder 7 is rendered very improbable, since both the outer annular bearing-face of the ring as well as the inner bearing-surface engaging the pin would have to stick in order to cause any binding. All bearing surfaces are kept well and constantly oiled from the grease-chamber 8. It will be understood that the cylinder 7 may be a roller adapted to cooperate with a cam, or may be fixed to another member such as an arm or lever.

What I claim as new is:

A wrist-pin bearing embodying a wrist-pin and a support therefor, a cylinder surrounding the wrist-pin and having an internal chamber larger than the diameter of the wrist-pin and having an annular rabbet formed in each end, this rabbet forming at each end an outwardly-facing shoulder as well as an annular bearing surface on the cylinder, a closure ring fitting in each annular rabbet and having a sliding bearing on the wrist-pin and also a sliding bearing on the annular bearing surface of the rabbet, the inner face of the ring abutting the outwardly-facing shoulder of the rabbet, exterior means being provided for holding said rings in their rabbet seats, the space between the wrist-pin and the cylinder forming a grease-chamber, for the purpose set forth.

In testimony whereof I hereunto affix my signature.

ROBERT W. GOSSETT.